Patented Sept. 11, 1951

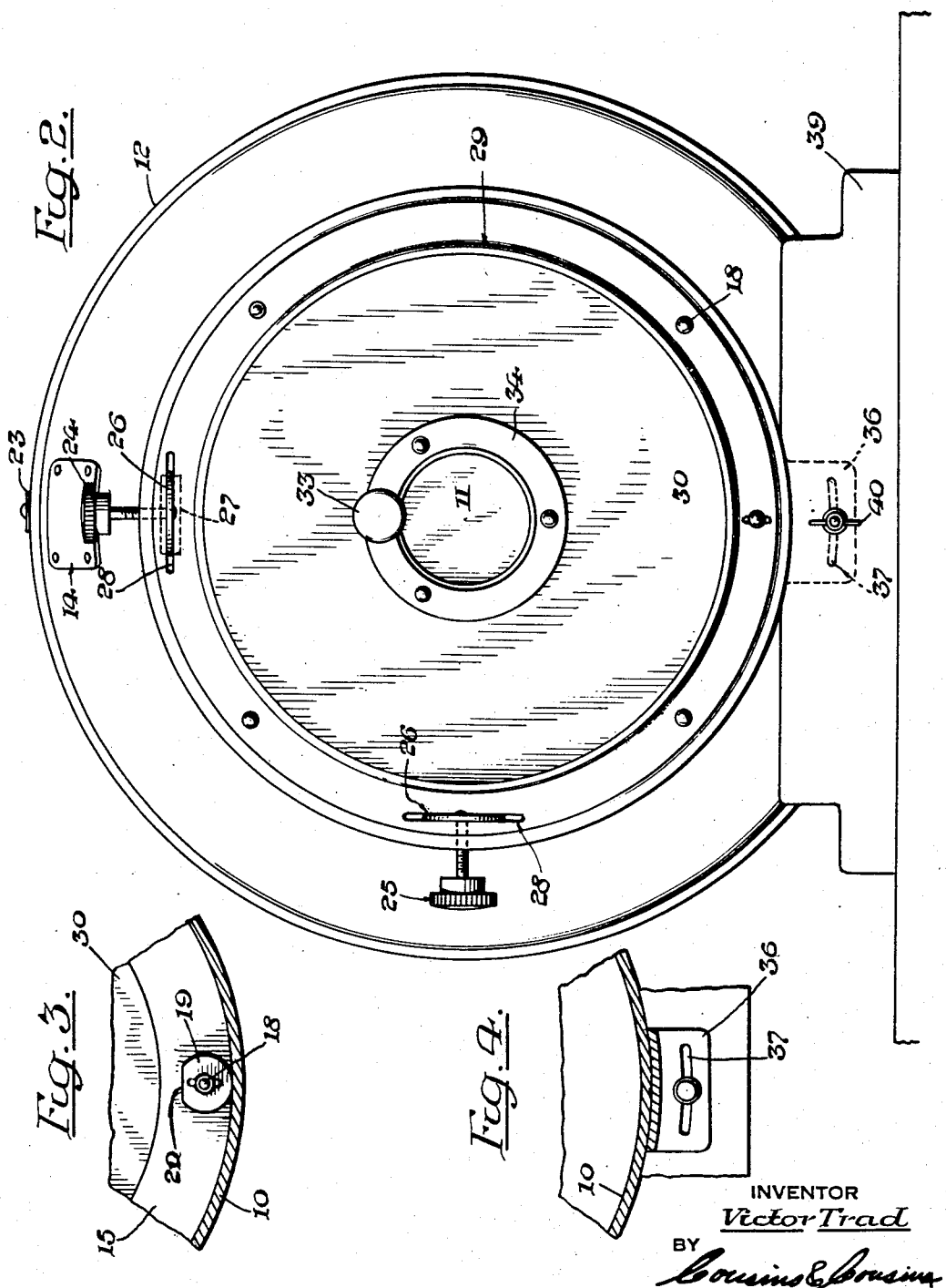

2,567,745

UNITED STATES PATENT OFFICE 2,567,745

PROJECTION LENS BARREL FOR SCHMIDT LENS SYSTEM

Victor Trad, Deal, N. J.

Application January 17, 1950, Serial No. 138,996

3 Claims. (Cl. 88—57)

This invention relates to a barrel for use in projecting television images, and specifically for projection systems known as the "Schmidt Lens System."

In arranging projected television lens systems, it often becomes necessary to adjust the position of the kinescope lens as well as the relationship of the lenses, so as to focus and bring the image into register with the screen upon which it is projected.

Accordingly, it is an object of this invention to provide an adjustable projection barrel for television use.

Another object of this invention is to provide a projection barrel which will rigidly support the component parts of the Schmidt lens system.

A further object of the invention is to provide a projection barrel which will occupy a minimum amount of space, and lend itself to ready adjustment, when necessary.

The invention consists of the construction, combination and arrangement of parts, as herein illustrated, described and claimed.

In the accompanying drawings, forming a part hereof, is illustrated one form of embodiment of the invention, in which drawings similar reference characters designate corresponding parts, and in which:

Figure 2 is a view taken in front elevation of the projection barrel, in accordance with the present invention.

Figure 3 is a fragmentary view taken on line 3—3 of Figure 1, looking in the direction indicated by the arrows.

Figure 4 is a fragmentary view taken on line 4—4 of Figure 1, looking in the direction indicated by the arrows.

Figure 1:
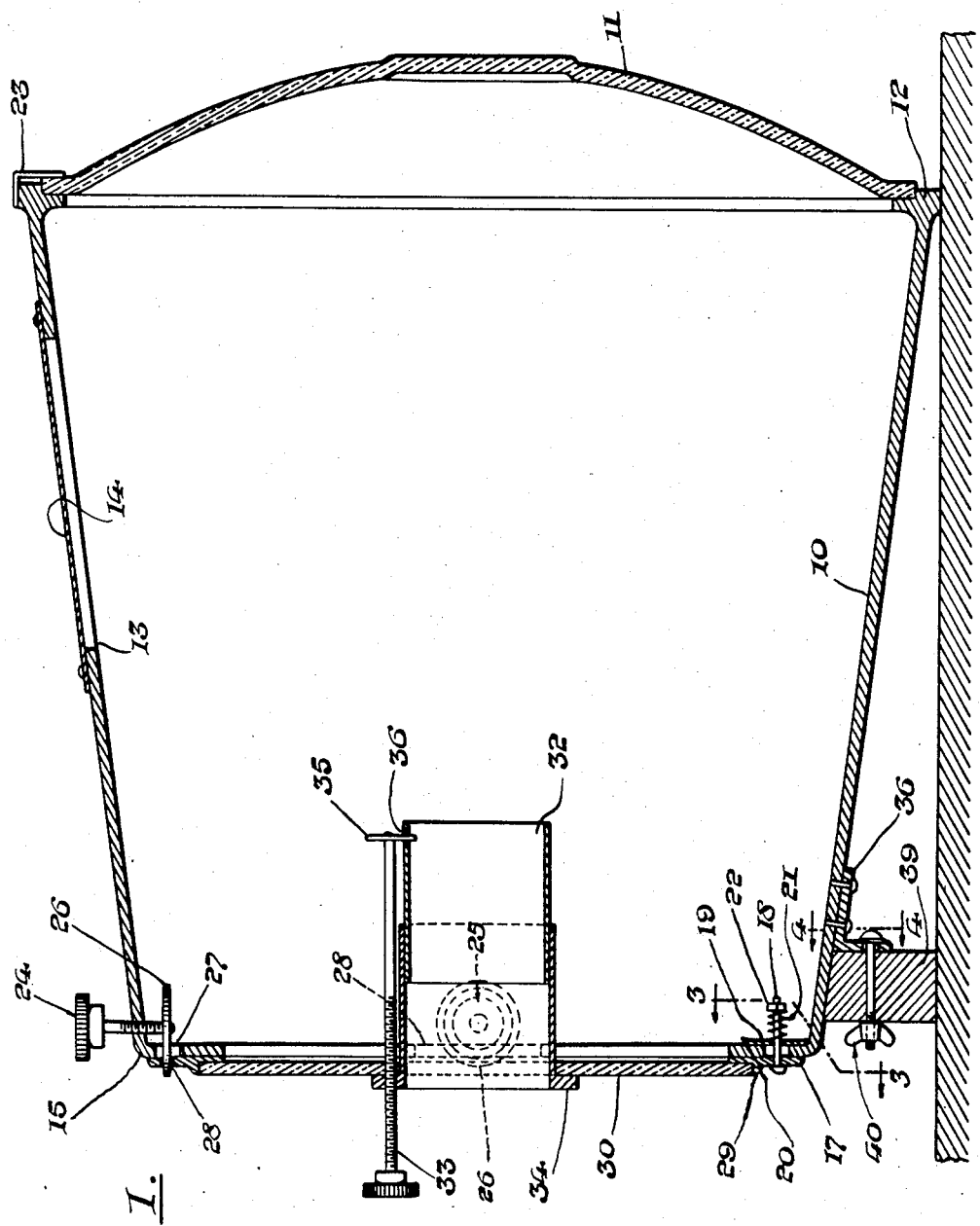
Figure 1 is a vertical section of a complete embodiment of the present invention.

Referring to the drawings, the reference numeral 10 indicates a rigid barrel formed from metal, plastic, or other suitable material, and having a substantially frusto-conical shape. The large end of the barrel 10 is closed by the inclusion of a spherical mirror 11, such as is used in the well known Schmidt lens system. The mirror 11 is supported upon flanges 12 and is held in place by a suitable bracket 23.

An opening 13 is provided in the wall of the barrel 10 for inspection and adjustment of the members within the barrel. A plate 14 is provided to cover the opening 13 in the barrel 10. The front of the barrel 10 is provided with an inwardly bent rim 15, said rim having apertures 16 therein for a hereinafter disclosed purpose.

A plate member 17 is carried upon the outer surface of the inwardly bent rim 15, and is secured to the said rim by studs 18. A washer 19 is slipped over each of the studs 18 and bears against the inside of the rim 15. The washers 19 are provided with a flattened portion 20 on the periphery thereof, so that the washers will not at any time extend into the field of the projected image. A spring member 21 is slipped over each stud 18 between the washer and the nut 22 threaded upon the end of the said stud 18. In this manner a spring loading is achieved between the plate 17 and the rim 15. The apertures 16 in the plate 17 are of such size that there is sufficient clearance around each of the studs 18 to permit the plate member 17 to be slid in a vertical or horizontal direction across the face of the rim 15.

The adjusting members by which the vertical or horizontal motions of the plate 17 may be achieved, are shown in Figures 1 and 2, and comprise set screws 24 and 25 which are carried by threaded bores 26 in the wall of the barrel 10. Attached to the end of each set screw 24—25 there is a disc 26. Each disc projects through an opening 27 in the rim 15 of the barrel 10. The size of the disc 26 is such that it engages a slot 28 machined in the plate member 17. The slots 28 are elongated as shown in Figure 2 so that the vertical or horizontal motion of the plate member 17 may be accomplished.

The plate member 17 is provided with a suitable flange 29, for the purpose of supporting thereon a correcting lens 30. The correcting lens 30 is provided with a central opening 31 therein, for the purpose of receiving therethrough a telescoping cylinder member 32. The cylinder member 32 is regulated by a worm 33 which is threaded through a flange 34 on the front of the cylinder member 32, and passes through the correcting lens 30 and thus into the barrel 10, adjacent the outer wall of the cylinder member 32. A disc 35 is secured to the end of the worm 33 and normal to the axis thereof. The disc 35 engages a slot 36 provided in the wall of the cylinder member 32. The rotation of the worm member 33 will, therefore, cause the cylinder member 32 to telescopically open or close, as desired.

The kinescope (not shown) is carried within the telescoping cylinder member 32, so that the motion of the worm 33 may be employed for focusing the televized image.

From time to time it becomes necessary to adjust the entire barrel so that the image is in register with the periphery of the screen upon which it is projected. For this purpose the barrel member 10 is provided with a bracket 36 secured to the wall thereof. The bracket 36 is slotted, as indicated at 37 in Figure 4. A screw member 38 is thrust through the bracket 36 and a support block 39. Some suitable tightening means such as a wing nut 40 may be employed to secure the bracket against the block 39. When it is desired to rotate the entire barrel 10, the wing nut 40 may be loosened and the barrel turned within the confines of the slot 37.

It becomes apparent from the foregoing that there has been provided a barrel assembly for use with television projecting systems, which is capable of every necessary adjustment requisite to produce a satisfactory image.

Having thus fully described the invention, what is claimed as new and sought to be secured by Letters Patent of the United States is:

1. A projector barrel assembly comprising, a barrel member having an opening at each end thereof, an inwardly turned rim on the front opening thereof, said rim having a plurality of bolt receiving openings therein a spherical mirror carried by the barrel within the rear opening of the said barrel, a correcting lens carried upon the front opening in the barrel, said lens being adapted to receive a light projecting member therein and adjusting means comprising a worm threadably carried by the barrel, a disc centrally mounted upon the end of said worm, and adapted to extend through an opening in the barrel rim adjacent said disc and a slot provided in the rim to receive the periphery of the said disc carried by the said barrel and a telescopic sleeve secured to the lens for focusing and orienting the light projected from the barrel.

2. A projector barrel assembly comprising, a barrel member, an inwardly turned rim on the front opening thereof, said rim having a plurality of bolt receiving openings therein, a spherical mirror carried within the rear opening of the said barrel, a correcting lens carried upon the front opening of the barrel, a central opening in the lens adapted to receive a light projecting member therein and adjusting means comprising, an assembly mounted upon the barrel along the vertical axis of the lens and an assembly mounted upon the barrel along the horizontal axis of the lens, each assembly consisting of a worm, a disc centrally mounted upon the end of said worm, and adapted to extend through an opening in the barrel adjacent said disc and a slot provided in the rim to receive the periphery of the said disc carried by the said barrel and a telescopic sleeve secured to the lens for focusing and orienting the light projected from the barrel.

3. A projector barrel assembly comprising, a barrel member, an inwardly turned rim on the front opening thereof, said rim having a plurality of bolt receiving openings therein, a spherical mirror carried within the rear opening of the said barrel, a correcting lens carried upon the front opening of the barrel, a central opening in the lens adapted to receive a light projecting member therein and adjusting means comprising, an assembly mounted upon the barrel along the vertical axis of the lens and an assembly mounted upon the barrel along the horizontal axis of the lens, each assembly consisting of a worm, a disc centrally mounted upon the end of said worm, and adapted to extend through an opening in the barrel adjacent said disc and a slot provided in the rim to receive the periphery of the said disc carried by the said barrel, a telescopic sleeve, an actuating worm coupled to the said sleeve, secured to the lens for focusing and orienting the light projected from the barrel.

VICTOR TRAD.

REFERENCES CITED

The following references are of record in the file of this patent:

UNITED STATES PATENTS

| Number | Name | Date |
|---|---|---|
| 2,273,801 | Landis | Feb. 17, 1942 |
| 2,295,779 | Epstein | Sept. 15, 1942 |
| 2,424,513 | Stephan | July 22, 1947 |
| 2,455,476 | Epstein | Dec. 7, 1948 |
| 2,466,331 | Schnable | Apr. 5, 1949 |
| 2,467,185 | Cady | Apr. 12, 1949 |